United States Patent
Lin et al.

(10) Patent No.: US 12,307,225 B2
(45) Date of Patent: May 20, 2025

(54) PROGRAMMING SYSTEM FOR TIRE PRESSURE MONITORING SENSOR AND METHOD FOR PROGRAMMING

(71) Applicants: Shih-Yao Lin, Taipei (TW); Chih-Wei Yu, Taipei (TW)

(72) Inventors: Shih-Yao Lin, Taipei (TW); Chih-Wei Yu, Taipei (TW)

(73) Assignee: SYSGRATION LTD., Taipei (TW)

( * ) Notice: Subject to any disclaimer, the term of this patent is extended or adjusted under 35 U.S.C. 154(b) by 75 days.

(21) Appl. No.: 17/577,021

(22) Filed: Jan. 17, 2022

(65) Prior Publication Data

US 2022/0253296 A1    Aug. 11, 2022

(30) Foreign Application Priority Data

Feb. 9, 2021   (TW) .................................. 110104929

(51) Int. Cl.
  G06F 9/44    (2018.01)
  B60C 23/04   (2006.01)
  G06F 8/61    (2018.01)
  G06F 9/445   (2018.01)
  G06F 9/455   (2018.01)

(52) U.S. Cl.
  CPC ............ *G06F 8/61* (2013.01); *B60C 23/0433* (2013.01); *B60C 23/0471* (2013.01); *B60C 23/0479* (2013.01)

(58) Field of Classification Search
  CPC ... G06F 8/61; B60C 23/0433; B60C 23/0417; B60C 23/0479
  See application file for complete search history.

(56) References Cited

U.S. PATENT DOCUMENTS

| | | | |
|---|---|---|---|
| 7,688,192 B2 * | 3/2010 | Kenny ................ | B60C 23/0408 340/447 |
| 9,024,743 B2 * | 5/2015 | Deniau ............... | B60C 23/0461 73/146 |
| 9,050,862 B2 * | 6/2015 | Mouchet ............ | B60C 23/0472 |
| 10,486,476 B2 * | 11/2019 | Patel .................. | B60C 23/0405 |
| 10,607,051 B2 * | 3/2020 | Hsu ..................... | G06K 7/1417 |
| 11,400,772 B2 * | 8/2022 | Bout ................... | B60C 23/0471 |

(Continued)

FOREIGN PATENT DOCUMENTS

| | | | | |
|---|---|---|---|---|
| CN | 109070666 A | * | 12/2018 | ......... B60C 23/0471 |
| CN | 109414969 A | * | 3/2019 | ......... B60C 23/0416 |

(Continued)

OTHER PUBLICATIONS

So Yeon Kim, Design of Low Power Operational TPMS System, 2015, pp. 1-4 https://ieeexplore.ieee.org/stamp/stamp.jsp?tp=&arnumber=7334859 (Year: 2015).*

(Continued)

*Primary Examiner* — Mongbao Nguyen

(57) ABSTRACT

A programming system includes a programming tool and a tire pressure monitoring sensor. The programming tool automatically chooses proper programming steps according to the verification code to record programs into the compatible tire pressure monitoring sensors so as to improve the shortcoming of manual choosing and recording the correct brand programs.

4 Claims, 3 Drawing Sheets

(56) References Cited

U.S. PATENT DOCUMENTS

| | | | | |
|---|---|---|---|---|
| 2014/0165026 | A1* | 6/2014 | McIntyre | G06F 8/65 |
| | | | | 717/100 |
| 2015/0015387 | A1* | 1/2015 | McIntyre | B60C 23/0471 |
| | | | | 340/447 |
| 2019/0107456 | A1* | 4/2019 | Wicher | B60C 23/0471 |
| 2020/0057999 | A1* | 2/2020 | Hsu | B60C 23/0471 |
| 2020/0317007 | A1* | 10/2020 | Wu | B60C 23/0479 |
| 2021/0178839 | A1* | 6/2021 | Deniau | B60C 23/0479 |
| 2021/0260936 | A1* | 8/2021 | Bout | B60C 23/0462 |
| 2022/0245971 | A1* | 8/2022 | Howard | G07C 5/008 |

FOREIGN PATENT DOCUMENTS

| | | | | | |
|---|---|---|---|---|---|
| CN | 110826670 | A | * | 2/2020 | |
| ES | 2710508 | T3 | * | 4/2019 | B60C 23/0416 |
| TW | 202026870 | A | * | 7/2020 | |
| TW | 202042162 | A | * | 11/2020 | |

OTHER PUBLICATIONS

Antriksh sharma, The Effect of Wheel Spin Velocity on the Propagation of Signal to Enhance the Performance of Tire Pressure Monitoring System, 2015, pp. 1-4. https://ieeexplore.ieee.org/stamp/stamp.jsp?tp=&arnumber=7150922 (Year: 2014).*

Mark Vaszary, Securing Tire Pressure Monitoring System for Vehicular Privacy, 2021, pp. 1-6. https://ieeexplore.ieee.org/stamp/stamp.jsp?tp=&arnumber=9369576 (Year: 2021).*

English translation, Wicher et al. (CN 109414969 A), 2019, pp. 1-13. (Year: 2019).*

Dongdong Hou, Design of The Wireless Code Update System Based on the Tire Pressure Monitoring Transmitter, 2017, pp. 1-4. https://ieeexplore.ieee.org/document/8243125?source=IQplus (Year: 2017).*

MS.C.Sharmila, Design of a Real-Time Tyre Press ure Monitoring System for LMVs, 2016, pp. 1-4. https://ieeexplore.ieee.org/stamp/stamp.jsp?tp=&arnumber=7916790 (Year: 2016).*

English translation, Wicher et al. (ES 2710508 T3), 2019, pp. 2-52. (Year: 2019).*

* cited by examiner

PROGRAMMING SYSTEM FOR TIRE PRESSURE MONITORING SENSOR AND METHOD FOR PROGRAMMING

BACKGROUND OF THE INVENTION

1. Fields of the Invention

The present invention relates to a programming system for a tire pressure monitoring sensor (TPMS), and more particularly, to the programming system that automatically chooses the specific programs of vehicle brands and automatically programs the specific programs to the tire pressure monitoring sensor.

2. Descriptions of Related Art

The tire pressure monitoring sensor (TPMS) automatically monitors the tire pressure and reports real-time tire-pressure information to the driver by using either a gauge, a pictogram display, or a simple low-pressure warning light. Generally, the vehicles are equipped with a TPMS when the vehicles are made. Different brands of vehicles develop their specific programs for their TPMS, and only the correct device can access the information of the TPMS.

There are many different after-market programming tools that have a database in which the programs of the tire pressure monitoring sensors of different brands are received. When a user purchases a new TPMS, the correct programs of the specific vehicle brand has to be written into it so as to access the information set by the vehicle makers.

However, the programs of different brands have specific programming steps so that the users have to manually choose the correct programming steps among the different vehicle makes to program the correct programs into the new-purchased TPMS. This takes a lot of time and has low efficiency.

The present invention intends to provide a programming system for automatic programming the correct programs of a specific vehicle brand into the new-purchased TPMS to eliminate the shortcomings mentioned above.

SUMMARY OF THE INVENTION

The present invention relates to a programming system for a tire pressure monitoring sensor, and comprises a programming tool and a tire pressure monitoring sensor. The programming tool has a control panel. The programming tool includes a central processor, a program database, a first wireless transmission module and a verification code issuing module built therein. The program database, the first wireless transmission module and the verification code issuing module are electrically connected to the central processor. The central processor is electrically connected to the control panel. The verification code issuing module issues a verification code by the first wireless transmission module. The tire pressure monitoring sensor includes a signal processor which is electrically connected to a program storage module, a verification code receiving module, a feed-back module and a second wireless transmission module. The verification code receiving module includes a pre-set verification code. When the verification code received by the verification code receiving module is equal to the pre-set verification code, the feed-back module issues an installation code to the first wireless transmission module of the programming tool by the second wireless transmission module.

The present invention also provides a method of programming for a tire pressure monitoring sensor. The method comprises the following steps:

step 1: operating a programming tool that is compatible to a tire pressure monitoring sensor;

Step 2: setting the programming tool to an auto programming mode;

step 3: the programming tool issuing a verification code;

step 4: the tire pressure monitoring sensor receiving the verification code, assuming that the verification code received by the tire pressure monitoring sensor is different from a pre-set verification code of the tire pressure monitoring sensor, proceed to a step 5A; assuming that the verification code received by the tire pressure monitoring sensor is equal to the pre-set verification code of the tire pressure monitoring sensor, proceed to a step 5B;

step 5A: assuming that the programming tool issues the verification code and does not receive a feed-back signal for a period of waiting time from the tire pressure monitoring sensor, the programming tool issues another verification code; assuming that the verification code received by the tire pressure monitoring sensor is different from the pre-set verification code of the tire pressure monitoring sensor, proceed to the step 5A; assuming that the verification code received by the tire pressure monitoring sensor is equal to the pre-set verification code of the tire pressure monitoring sensor, proceed to the step, and step 5B: the tire pressure monitoring sensor issuing an installation code to the programming tool, the programming tool installing a program corresponding to the installation code to the tire pressure monitoring sensor, the step 1 and the step 2 being exchangeable.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
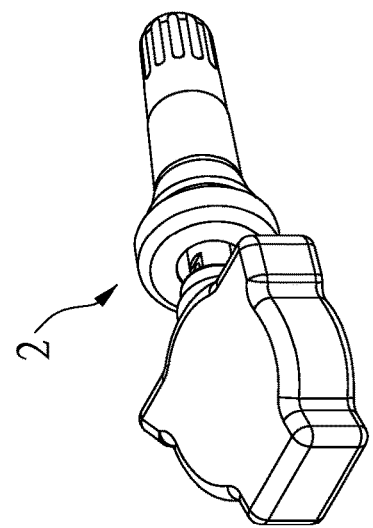
FIG. 1 shows the tire pressure monitoring sensor and the programming tool of the present invention.
Figure 1:
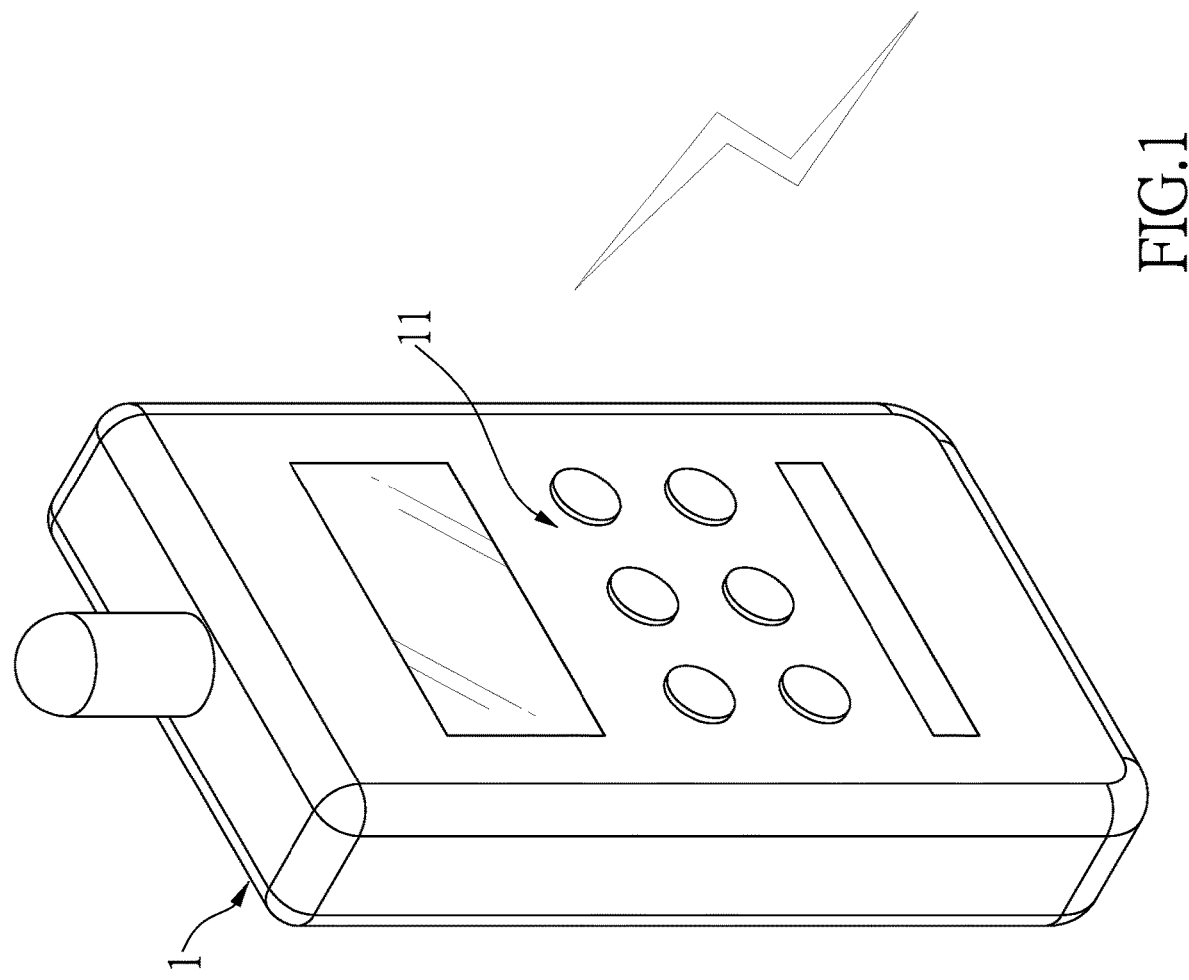
Figure 2:
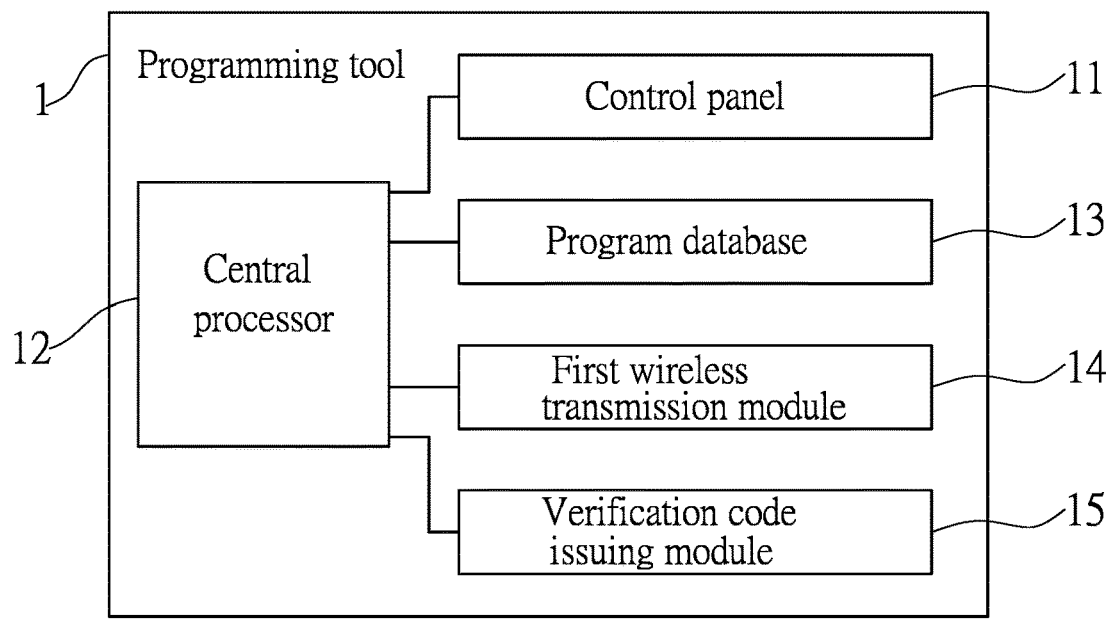
FIG. 2 illustrates the components of the tire pressure monitoring sensor and the programming tool of the present invention.
Figure 2:
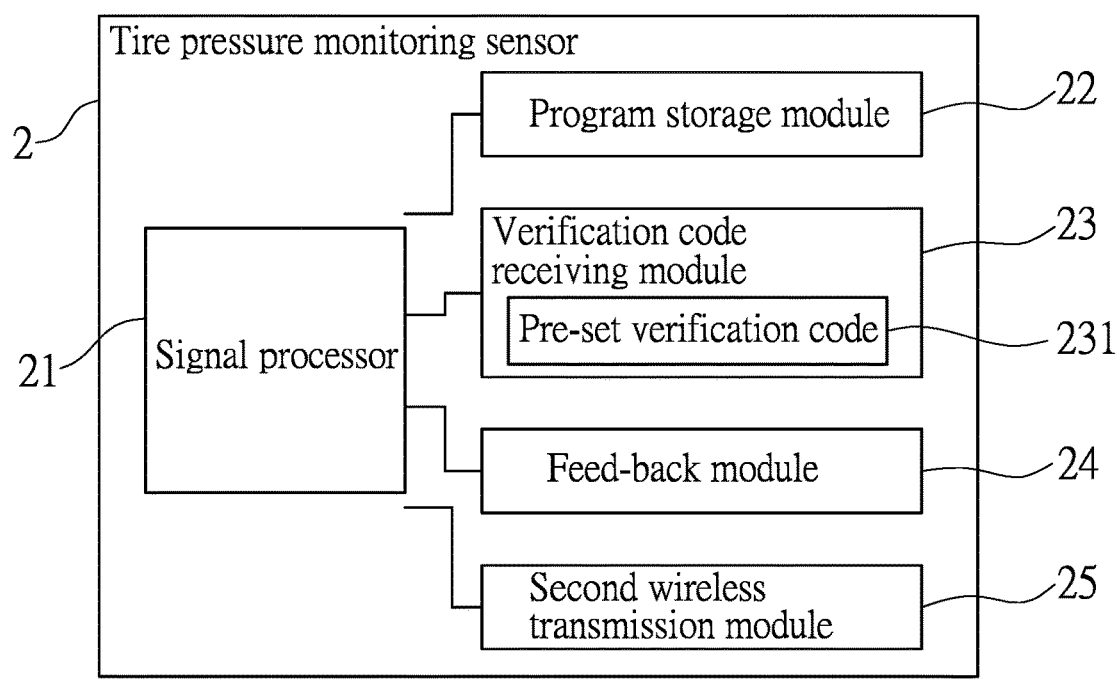

Referring to FIGS. 1 and 2, the programming system of the present invention comprises a programming tool 1 and a tire pressure monitoring sensor 2. The programming tool 1 includes a control panel 11 for the users to operate the programming tool 1. The programming tool 1 has a central processor 12, a program database 13, a first wireless transmission module 14 and a verification code issuing module 15 built therein. The program database 13, the first wireless transmission module 14 and the verification code issuing module 15 are electrically connected to the central processor 12. The central processor 12 is electrically connected to the control panel 11. The verification code issuing module 15 issues a verification code by the first wireless transmission module 14. The tire pressure monitoring sensor 2 includes a signal processor 21 which is electrically connected to a program storage module 22, a verification code receiving module 23, a feed-back module 24 and a second wireless transmission module 25. The verification code receiving module 23 includes a pre-set verification code 231. When the verification code received by the verification code receiving module 23 is equal to the pre-set verification code 231, the feed-back module 24 issues an installation code to the first wireless transmission module 14 of the programming tool 1 by the second wireless transmission module 25.

The program database 12 stores programs of the compatible tire pressure monitoring sensor of different models and vehicle brands.

The power supply of the programming tool 1 can be a disposable battery, a rechargeable battery, or an external power supply.

The central processor 12 processes and transfers signals and programs between the electrically connected components.

The signal processor 21 processes signals and programs between the electrically connected components.

Figure 3:
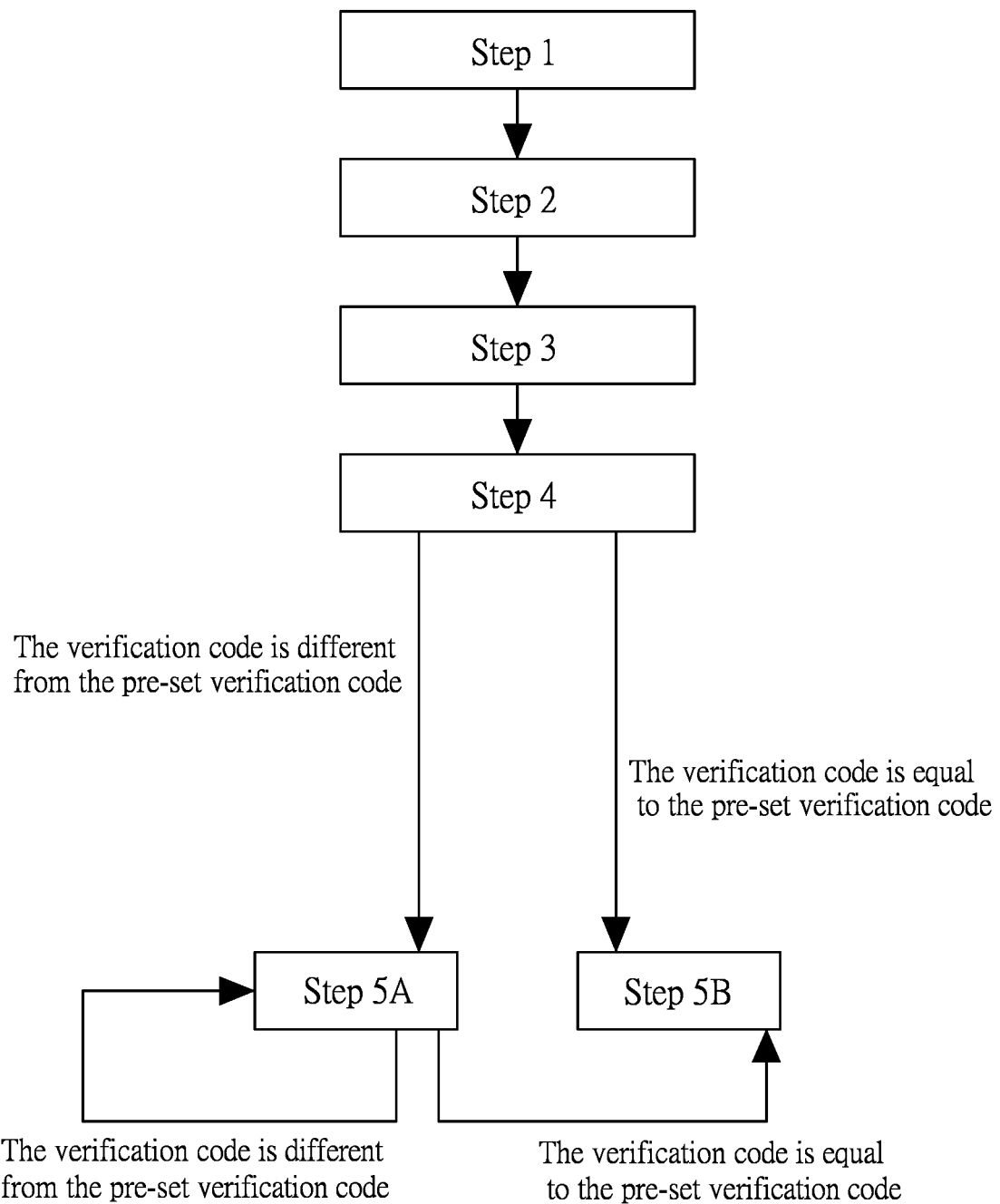
FIG. 3 illustrates the steps of the method of the present invention.

As shown in FIG. 3, the method of programming for a tire pressure monitoring sensor comprises the following steps:

step 1: operating a programming tool 1 that is compatible to a tire pressure monitoring sensor;

Step 2: setting the programming tool 1 to an auto programming mode;

step 3: the programming tool 1 issuing a verification code by a first wireless transmission module 14 and a verification code issuing module 15;

step 4: the tire pressure monitoring sensor 2 including a verification code receiving module 23 which is cooperated with a second wireless transmission module 25 to receive the verification code, assuming that the verification code received by the tire pressure monitoring sensor 2 is different from a pre-set verification code 231 of the tire pressure monitoring sensor 2, proceed to a step 5A; assuming that the verification code received by the tire pressure monitoring sensor 2 is equal to the pre-set verification code 231 of the tire pressure monitoring sensor 2, proceed to a step 5B;

step 5A: assuming that the programming tool 1 issues the verification code and does not receive a feed-back signal for a period of waiting time (5 seconds, for example) from the tire pressure monitoring sensor 2, the programming tool 1 issues another verification code; assuming that the verification code received by the tire pressure monitoring sensor 2 is different from the pre-set verification code 231 of the tire pressure monitoring sensor 2, proceed to the step 5A; assuming that the verification code received by the tire pressure monitoring sensor 2 is equal to the pre-set verification code 231 of the tire pressure monitoring sensor 2, proceed to the step 5B, and step 5B: the tire pressure monitoring sensor 2 issuing an installation code by the feed-back module 24 via the second wireless transmission module 25 to the first wireless transmission module 14 of the programming tool 1, the programming tool 1 using the central processor 12 to compare an installation code to the programs in the program database 13 and installing programs corresponding to the installation code to a program storage module 22 of the tire pressure monitoring sensor 2; the step 1 and the step 2 being exchangeable.

Consumers simply purchase after-market tire pressure monitoring sensor from different manufacturers and the after-market tire pressure monitoring sensor are compatible to the programming tool 1, the staff of the repair shop can use the automatic programming mode of the programming tool 1 to quickly install the programs of the corresponding manufacturer to the tire pressure monitoring sensor. For example, the consumer purchases a tire pressure monitoring sensor 2 of model A of brand A, and it is compatible to the list built in the programming tool 1, then the programming tool 1 can automatically program the tire pressure monitoring sensor 2 with the programs of the model A of the brand A by the automatic programming mode.

It is noted that, even if the tire pressure monitoring sensor 2 with the verification code of the model A of the brand A, not only the tire pressure monitoring sensor 2 can program the model A of the brand A, the programming tool 1 can still program other model of other brands manually.

The transmission way of the first wireless transmission module 14 and the second wireless transmission module 25 is Low Frequency (LF), Radio Frequency (RF) or Bluetooth so as to meet the transmission frequency and transmission way of the existed tire pressure monitoring sensors.

While we have shown and described the embodiment in accordance with the present invention, it should be clear to those skilled in the art that further embodiments may be made without departing from the scope of the present invention.

What is claimed is:

1. A programming system for a tire pressure monitoring sensor (TPMS), comprising:

a TPMS programming tool having a control panel, the TPMS programming tool having a central processor, a program database, a first wireless transmitter and a verification code generator built therein, the program database, the first wireless transmitter and the verification code generator being electrically connected to the central processor, the central processor electrically connected to the control panel, the verification code generator issuing a verification code by the first wireless transmitter, and a tire pressure monitoring sensor having a signal processor which is electrically connected to a program storage memory, a verification code receiver, a feed-back device and a second wireless transmitter, the verification code receiver including a pre-set verification code, when the verification code received by the verification code receiver is equal to the pre-set verification code, the feed-back device issues an installation code to the first wireless transmitter of the TPMS programming tool by the second wireless transmitter, the TPMS programming tool identifies different models of the tire pressure monitoring sensor and installs a corresponding program.

2. The programming system for a tire pressure monitoring sensor as claimed in claim 1, wherein a transmission way of the first wireless transmitter and the second wireless transmitter is Low Frequency (LF), Radio Frequency (RF) or Bluetooth.

3. A method of programming for a tire pressure monitoring sensor (TPMS), comprising:

step 1: operating a TPMS programming tool to be compatible to a tire pressure monitoring sensor;

Step 2: setting the TPMS programming tool to an auto programming mode;

step 3: the TPMS programming tool issuing a verification code;

step 4: the tire pressure monitoring sensor receiving the verification code, assuming that the verification code received by the tire pressure monitoring sensor is different from a pre-set verification code of the tire pressure monitoring sensor, proceed to a step 5A; assuming that the verification code received by the tire pressure monitoring sensor is equal to the pre-set verification code of the tire pressure monitoring sensor, proceed to a step 5B;

step 5A: assuming that the TPMS programming tool issues the verification code and does not receive a feed-back signal for a period of waiting time from the tire pressure monitoring sensor, the TPMS programming tool issues another verification code; assuming that the verification code received by the tire pressure monitoring sensor is different from the pre-set verification code of the tire pressure monitoring sensor, proceed to the step 5A; assuming that the verification code received by the tire pressure monitoring sensor is equal to the pre-set verification code of the tire pressure monitoring sensor, proceed to the step 5B, and step 5B: the tire pressure monitoring sensor issuing an installation code to the TPMS programming tool, the TPMS programming tool installing a program corresponding to the installation code to the tire pressure monitoring sensor se as to complete the steps for enabling the TPMS programming tool to automatically identify a brand of the tire pressure monitoring sensor and install the corresponding program.

4. The method as claimed in claim 3, wherein a transmission way between the TPMS programming tool and the tire pressure monitoring sensor is Low Frequency (LF), Radio Frequency (RF) or Bluetooth.

\* \* \* \* \*